G. R. LAWRENCE.
INTERNAL COMBUSTION ENGINE.
APPLICATION FILED APR. 21, 1913.

1,160,419.

Patented Nov. 16, 1915.
7 SHEETS—SHEET 1.

UNITED STATES PATENT OFFICE.

GEORGE R. LAWRENCE, OF CHICAGO, ILLINOIS.

INTERNAL-COMBUSTION ENGINE.

1,160,419.　　　　Specification of Letters Patent.　　Patented Nov. 16, 1915.

Application filed April 21, 1913. Serial No. 762,697.

*To all whom it may concern:*

Be it known that I, GEORGE R. LAWRENCE, a citizen of the United States, residing at Chicago, county of Cook, State of Illinois, have invented a certain new and useful Improvement in Internal-Combustion Engines, and declare the following to be a full, clear, and exact description of the same, such as will enable others skilled in the art to which it pertains to make and use the same, reference being had to the accompanying drawings, which form a part of this specification.

My invention relates to internal combustion engines and has for its object to provide an improved method and apparatus for generating power.

The various features of novelty whereby my invention is characterized will hereinafter be pointed out with particularity in the claims; but, for a full understanding of my invention and of its object and advantages, including the object heretofore specified as well as others, reference may be had to the following detailed description taken in connection with the accompanying drawings, wherein:

Fig. 3 is a section taken approximately on line 3—3 of Fig. 1 or on line 3—3 of Fig. 2.

In the drawings I have illustrated two forms of my invention, each illustrating an engine having three cylinders and, for the sake of clearness and brevity, I shall confine the detailed description to the three cylinder engine although the invention is of course not confined to engines having any particular number of cylinders.

Referring to the first nine figures of the drawings, 1, 2 and 3 represent the three cylinders of an internal combustion engine mounted upon a suitable structure, 4, which constitutes a combined supporting frame and crank case. The cylinders are conveniently mounted by screwing them into the top of the crank case, providing them with annular shoulders, 5, which will engage with the top of the crank case and determine the vertical positions of the cylinders. In the crank case is mounted a suitable crank shaft to which the several pistons, 7, (of which only one is shown) are suitably connected.

Figure 1:
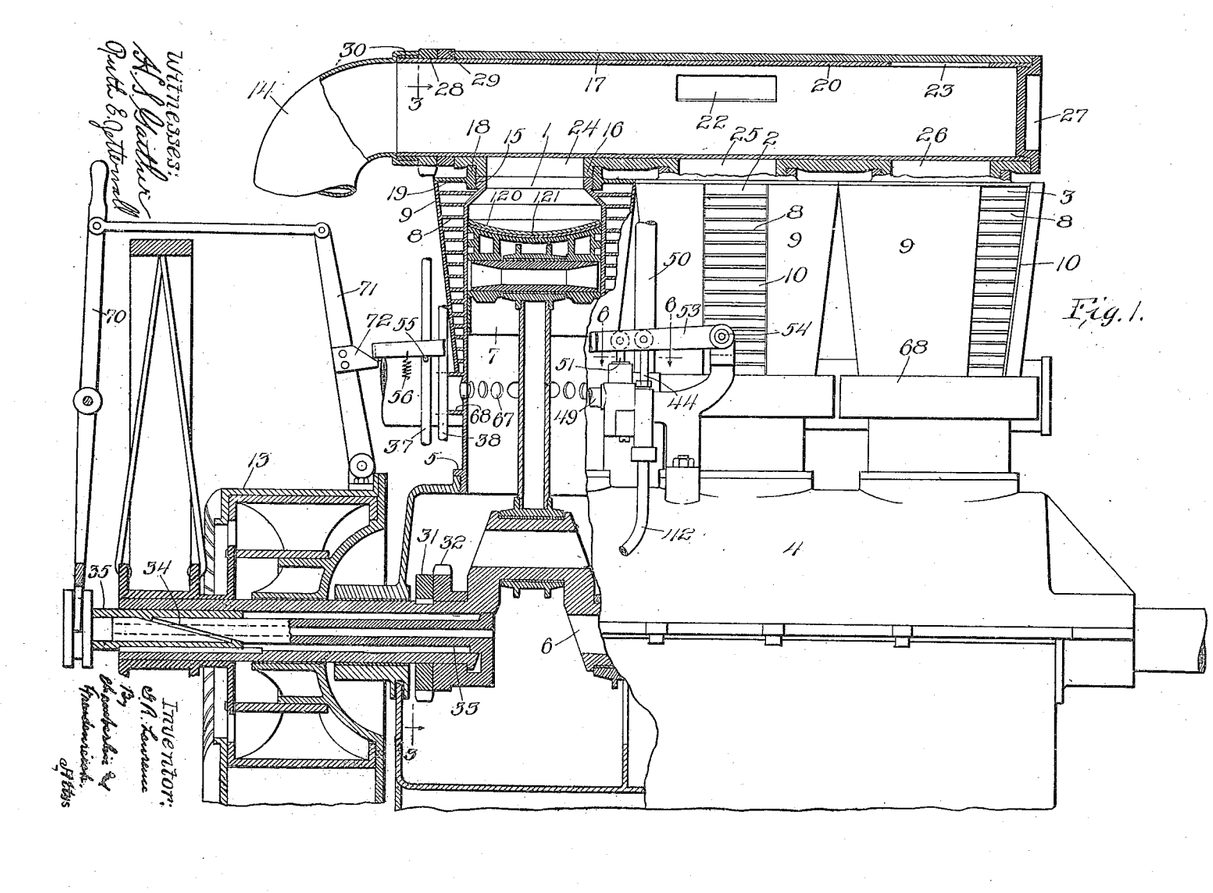
Figure 1 is a view partly in side elevation and partly in section of an engine arranged in accordance with one form of my invention.

The walls of the cylinders are made thin and are provided on the exterior with a number of thin annular ribs or veins, 8. Each cylinder is partially surrounded by a suitable casing, 9, the casings being continuous except that each has a section removed down one side so as to expose a portion of each of the ribs or veins on that cylinder. In the arrangement shown, the opening 10 of the casing for the intermediate cylinder is arranged at one side of the engine while the corresponding openings in the other two casings, as will be seen from Figs. 1 and 3, are arranged on the same side of the engine but angularly disposed in opposite directions relative to the opening in the casing for the intermediate cylinder. On the opposite side of the engine the several casings are connected to a manifold, 11, from which leads a conduit, 12, of large diameter. This conduit, as will best be seen from Figs. 2 and 5, leads into one side of a cylindrical blower or compressor casing 13 mounted at one end of the engine and surrounding the crank shaft. From another point on the blower casing leads a conduit, 14, which is carried up to the top of the engine cylinders. The conduit 14 opens into a combined reservoir and valve mechanism for the cylinders which I shall now describe.

The upper end of each cylinder has a screw threaded external portion, 15, preferably in the form of an open neck somewhat smaller in diameter than the cylinder. Lying upon the upper faces of these screw threaded portions are hollow hubs or bosses, 16, forming part of an elongated cylindrical housing, 17. The parts 15 and 16 may conveniently be fastened together by means of internally screw threaded rings, 18, made with right and left hand threads meshing with the threads on the members 15 and 16. When the parts are assembled the cylinders are in communication with the interior of the housing 17. If desired, the rings 18 may be provided with flanges, 19, which serve as covers for closing the tops of the casings 9 and as added ribs or veins to the cylinders. One end of the member 17 is closed in any suitable manner while the other end is connected to the conduit 14.

Within the cylindrical housing 17 is revolubly fitted a long, tubular valve, 20, the valve being in the form of a cylindrical sleeve fitting within the housing and having therein three ports, 21, 22 and 23, distributed 120 degrees apart relative to the axis of the sleeve and each lying directly above one of the cylinders so that they will successively register with ports, 24, 25 and 26 in the hubs or bosses 16 as the sleeve is rotated and thus intermittently making and breaking communication between each of the cylinders and the interior of the sleeve. In the arrangement shown, the closing of one end of the cylindrical housing is effected by means of a cap, 27, screwed or otherwise secured into one end of the sleeve 20 and having a portion engaging with the end of the housing so as to limit relative endwise movements in one direction. Upon the other end of the sleeve are fixed two toothed collars or wheels, 28 and 29, by means of which the sleeve is actuated, these collars or wheels abutting against the adjacent end of the cylindrical housing and coöperating with the cap at the other end to prevent endwise movements of the sleeve in either direction. The open end of the sleeve is connected to the end of the conduit 14 by means of a suitably packed joint, 30, which will permit the sleeve to rotate.

The sleeve 20, which I shall term the main valve, is operated from the crank shaft, there being on the crank shaft just below the members 28 and 29 two similar toothed members, 31 and 32; the member 31 being fixed to the crank shaft and the member 32 being adjustable angularly about the crank shaft. The member 32 is carried upon the inner end of a shaft, 33, which extends through one end of the crank shaft. On the opposite end of the member 33 is a thread, 34, having a steep pitch, and surrounding the threaded portion is a sleeve, 35, splined within the crank shaft so as to be free to move endwise therein and be held against rotation. By moving the sleeve 35 endwise in one direction or the other the shaft 33 is caused to rotate, carrying with it the toothed member 32 and thus advancing the teeth on this member toward the corresponding teeth on the member 31 or else increasing the angular distance between the corresponding teeth depending upon the direction in which the actuating sleeve is moved.

Suitably mounted upon the stationary portions of the engine structure are two rods, 37 and 38, the rod 37 lying between the toothed members 28 and 31 and serving to transmit motion from the latter to the former, and the rod 38 lying between the toothed members 29 and 32 and serving in a similar manner to transmit motion from the member 32 to the member 29. A suitable spring, 39, may be placed on each of the rods to retract the same when released from one of the teeth on its driving member.

The means for introducing the fuel into the engine cylinders is as follows. Upon a stationary portion of the engine structure and preferably in proximity to the cylinders is mounted a combined charge-measuring and charge-admission device. The details of this device are best shown in Figs. 6 to 9 inclusive. Referring to these figures, 40 is a suitable casting having therein a pump chamber, 41, into the lower end of which leads a fuel supply pipe, 42. In the lower end of the chamber is a check valve, 43. A plunger, 44, extends into the pump chamber from above. In the casting is a second chamber, 45, connected to the pump chamber at a point somewhat above the check valve 43 by a passage, 46, containing a check valve, 47. With this arrangement, the pipe 42 being connected to a source of liquid fuel, the reciprocation of the pump plunger causes fuel to be drawn into the pump chamber on one stroke and to be forced out into the chamber 45 on the return stroke. Measured quantities of liquid fuel are therefore delivered to the chamber 45 in amounts depending upon the length of the stroke of the plunger. The casting is cored out so as to provide in the same a passage, 48, extending transversely of and intercepting the chamber 45. Connected with one end of this passage is an air supply pipe, 49, while from the other end of the passage leads a pipe, 50, which extends to the engine cylinders as will be hereinafter described. Extending down into the chamber 45 through the top of the casting is a plunger, 51, which preferably has its lower end beveled on two sides so as to reduce the extreme lower end to a thin edge as indicated at 52. The plunger 51 serves as a valve to shut off communication between the pipes 49 and 50 and between these pipes and the lower portion of the chamber 45. When the plunger is in the position indicated in Fig. 9 there is no communication between the pipes 49 and 50 or between these pipes and the lower portion of the chamber 45 so that any fuel which is delivered into the chamber remains there undisturbed. When the plunger 51 is raised somewhat communication between the pipes 49 and 50 is established around the beveled under end of the plunger and through the lower portion of the chamber 45. Consequently if the pipe 49 contains air under pressure this air will rush down against the fuel lying in the bottom of the chamber 45, picking up the fuel and then traveling up past the opposite side of the beveled end of the plunger and into the pipe 50.

Figure 2:
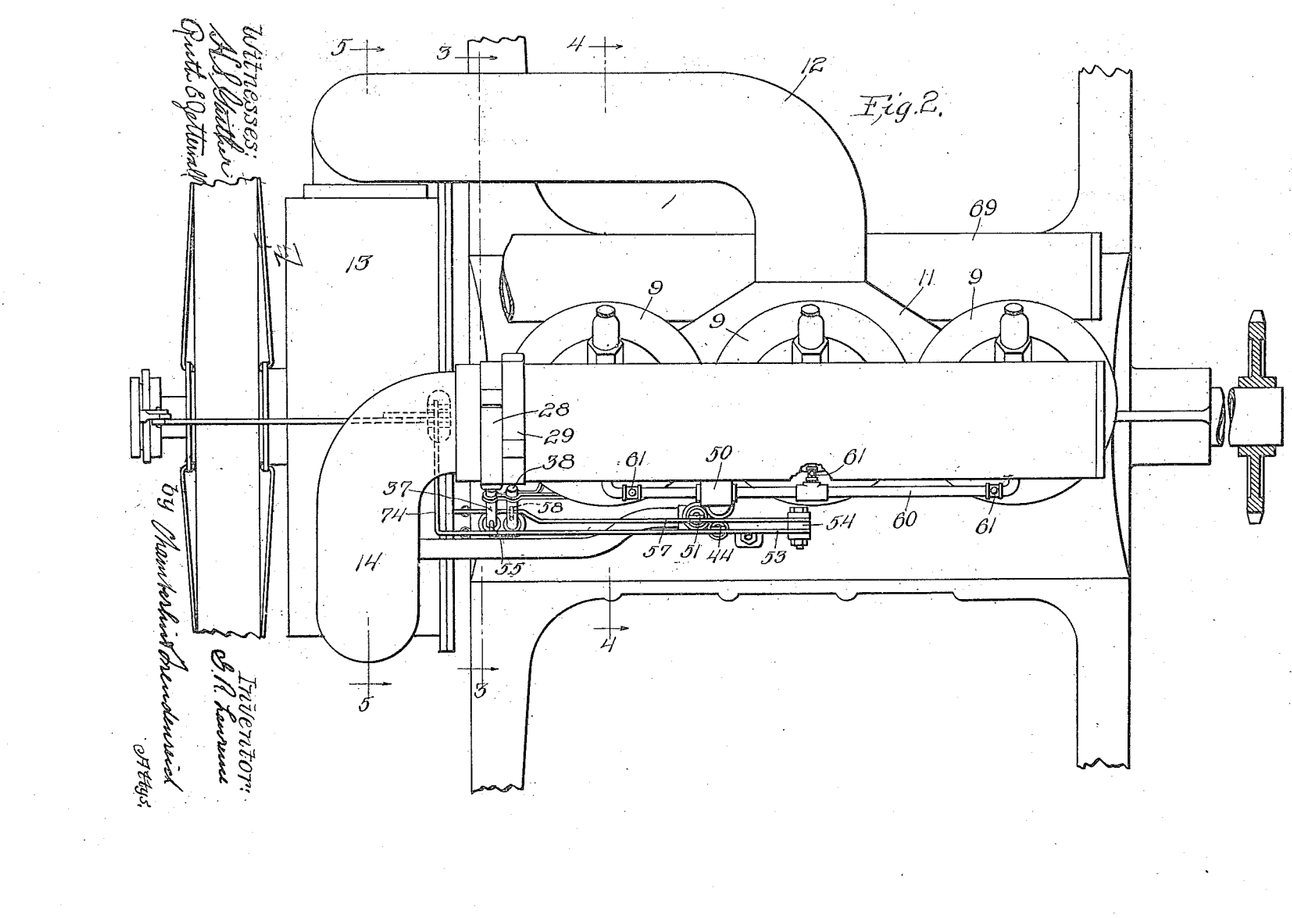
Fig. 2 is a plan view of the engine shown in Fig. 1.

The two plungers are operated from the rods, 37 and 38 as will most clearly be seen from Figs. 1 and 2. Connected to the upper end of the plunger 44 is a lever, 53, hinged at one end, as at 54, to a stationary part of the engine structure and at its opposite end overlying a pin, 55, on the rod 37. A suitable spring, 56, tends to hold the latter end of the lever down and consequently to hold the pump plunger in its lowermost position. As the rod 37 reciprocates it causes the lever 53 to oscillate and the pump to be actuated in unison therewith. A second lever, 57, is connected to the upper end of the plunger 51, is hinged at 54 and overlies a pin, 58, on the rod 38. Consequently the plunger 51 is caused to reciprocate in unison with the rod 38.

Figures 4, 5:
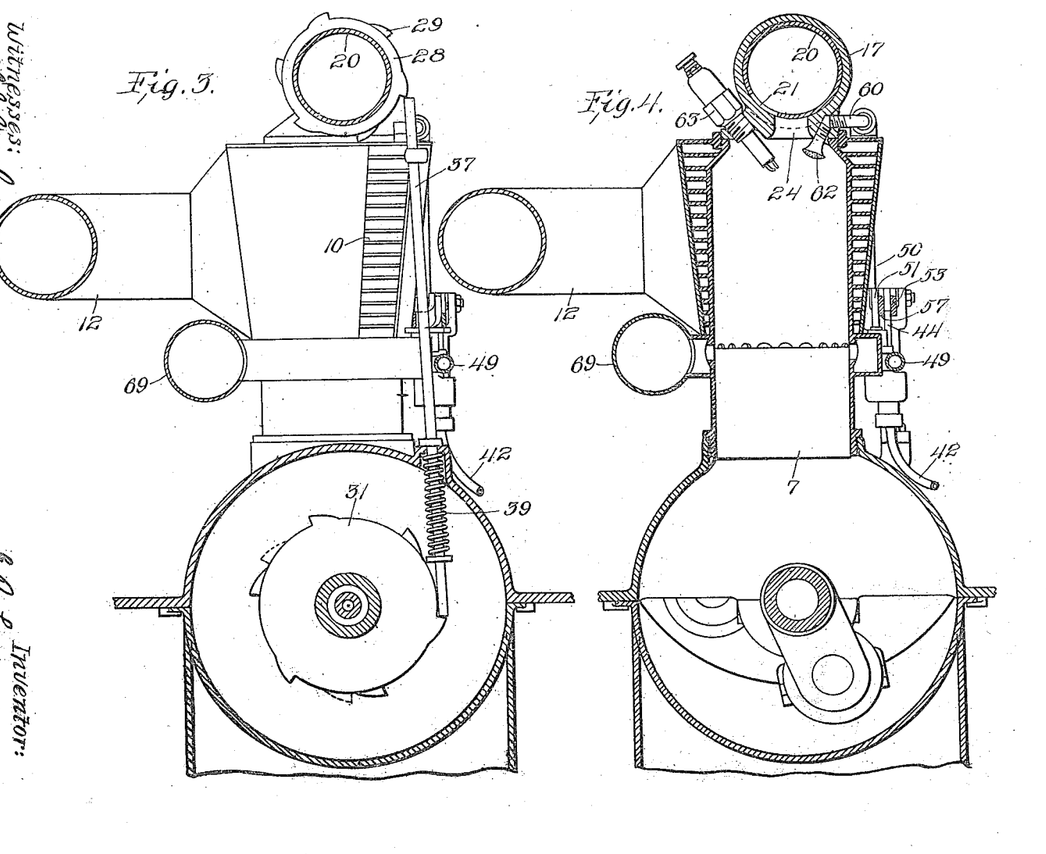
Fig. 4 is a section taken approximately on line 4—4 of Fig. 2.
Fig. 5 is a section on line 5—5 of Fig. 2.
Figure 5:
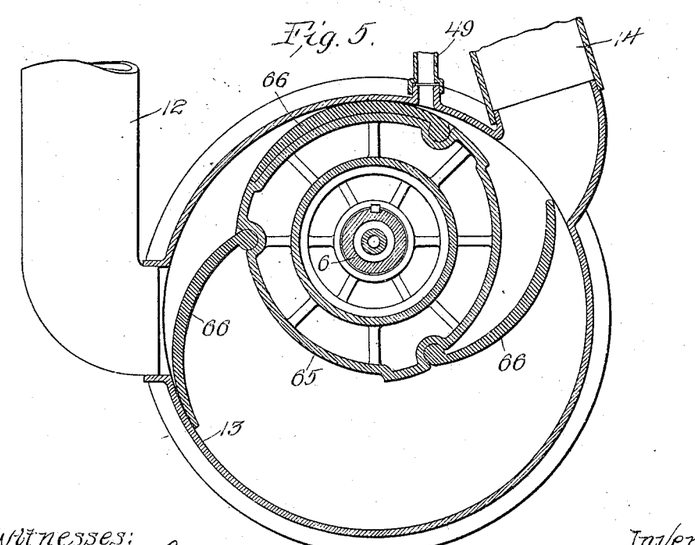
Figure 6:
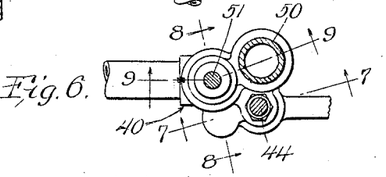
Fig. 6 is a section on line 6—6 of Fig. 1, being substantially a plan view of the fuel pump and change-controlling valve.
Figure 7:
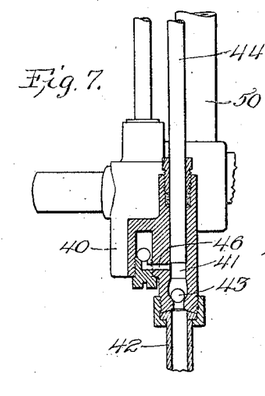
Fig. 7 is a section taken approximately on line 7—7 of Fig. 6.
Figure 8:
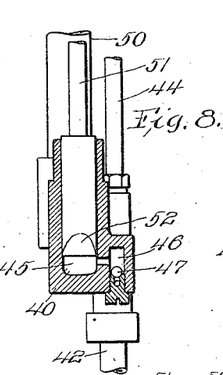
Fig. 8 is a section taken approximately on line 8—8 of Fig. 6.
Figure 9:
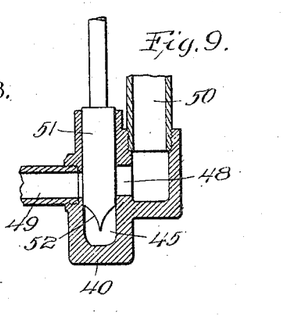
Fig. 9 is a section taken approximately on line 9—9 of Fig. 6.
Figure 10:
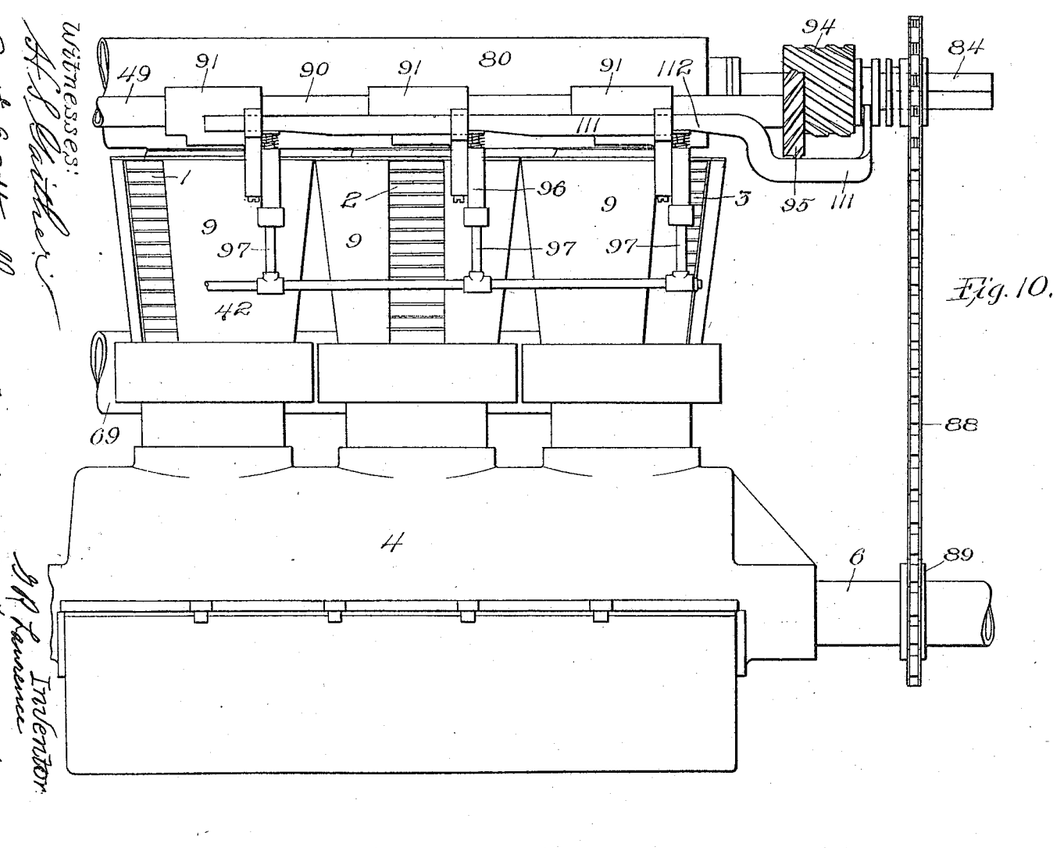
Fig. 10 is a side elevation of a portion of an engine arranged in accordance with a different form of my invention.
Figure 11:
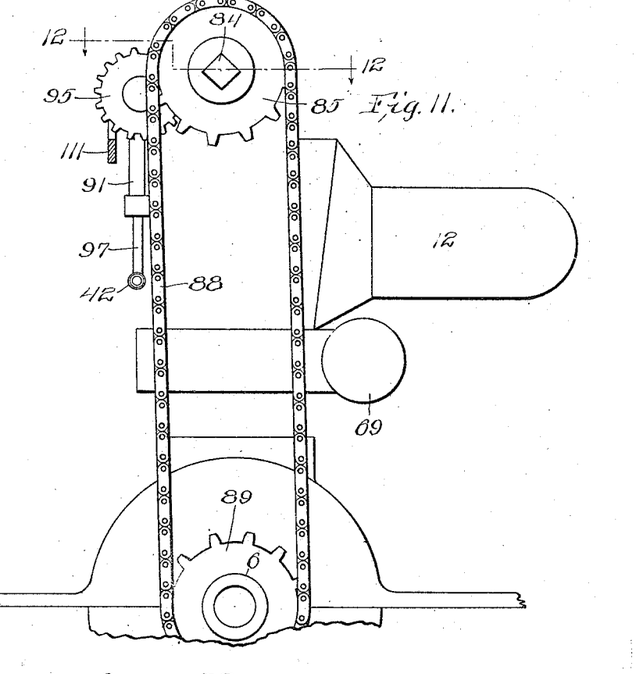
Fig. 11 is an end view looking toward the left from the right hand end of Fig. 10.
Figure 12:
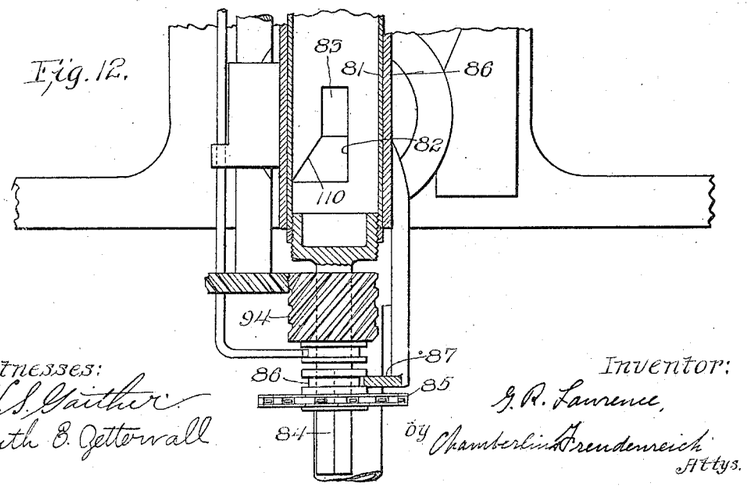
Fig. 12 is a section taken approximately on line 12—12 of Fig. 11, showing one end of the engine only.

As best shown in Figs. 2 and 4, the pipe 50 terminates in a horizontal branch pipe, 60, connected at its ends to the two end cylinders of the engine and at the middle to the intermediate cylinder. At each cylinder is a check valve, 61, which prevents pressure from the cylinder reaching the pipe. The connection between the pipe 60 and the cylinders may conveniently be through the hubs or bosses 16 on the cylindrical housing 17, each of the hubs or bosses being provided with a spraying head, 62, lying in the upper end of the corresponding cylinder and adapted to spray the incoming mixture toward the spark plug, 63, or other igniting device.

Air is supplied to the pipe 49 from the blower which discharges into the main valve 20 through the conduit 14. The construction of the fan is best shown in Figs. 1 and 5. The blower casing 13 is placed eccentrically with respect to the crank shaft and on the crank shaft is mounted a cylindrical drum, 65, on the periphery of which are hinged three wings or vanes, 66. As the crank shaft revolves, the vanes one after another pass by the inlet which is the end of the conduit 12 and carry a large body of air toward the outlet conduit 14, compressing this air on account of the eccentricity of the structure, so that air is delivered to the conduit 14 and consequently to the combined main valve and reservoir 20 at considerable pressure. The pipe 49 which carries air by means of which the fuel is injected into the cylinders is tapped into the blower casing a short distance beyond the main discharge outlet and at a point which permits a small body of compressed air to be pocketed by the oncoming vane and be carried beyond the main discharge outlet, the pressure of the air being greatly increased as the vane passes from the main outlet to the pipe 49 so that the air is delivered to the pipe 49 at a high pressure.

The air and the fuel all enter the cylinders at the top while the combustion gases and the air used for scavenging purposes leaves the cylinders at points near the bottom; each cylinder being provided in a plane just above the top of the piston when the latter is at the limit of its downward movement with a row of exhaust ports, 67, extending entirely around the same, these exhaust ports opening out into closed boxes or casings, 68, surrounding the cylinders and each connected to an exhaust manifold, 69.

The operation is as follows: Assuming the engine to be running, air will be drawn by the blower through the inlet openings in the casings around the cylinders, cooling the cylinders and warming the air. The blower compresses this air and delivers it into the combined main valve and reservoir. The blower also compresses a portion of the incoming air to a still higher degree and forces it into the pipe leading to the fuel-measuring and injecting device. Since there are three of the vanes in the blower, corresponding in number to the cylinders, there will be three distinct impulses of air into the fuel-measuring and injecting device during each revolution of the engine, corresponding in time with the three periods during which fuel is to be injected into the cylinders. The toothed members 28 and 31 on the main valve and on the crank shaft respectively are so disposed that each port in the main valve is brought to register with the port in the upper end of the corresponding cylinder at just about the time the exhaust ports in that cylinder are being opened. Consequently the air which is stored up in the main valve and in the supply conduit 14 and that which is at the moment being delivered by the blower, rushes down through the cylinder and passes out through the exhaust ports, sweeping the cylinder clean of all products of combustion and, cooling the walls of the cylinder. This condition will be maintained until the valve is turned far enough to shut off communication between the cylinder which has just been scavenged and the interior of the main valve. The air contained in the cylinder will now be compressed by the piston on its return stroke. The entire control of the main valve might be through the toothed members 28 and 31; but, in order that the engine may be made to produce any desired power and not always be run at full capacity, I prefer to utilize the toothed members 28 and 31, only, to bring the main valve into its open position the movement of the valve to its closed positions being accomplished by means of the members 29 and 32. As heretofore explained, the member 32 may be angularly adjusted, thus making it possible to vary the intervals between the opening impulses and the closing impulses imposed on the main valve. In other words, the main valve may be closed as soon as a piston starts on its compression stroke, thus leaving the whole cylinder full of air to be compressed; or, if desired, the main valve may be left open until the piston has returned to any predetermined point on its return stroke so that some of the air in the cylinder will be forced back through the main valve as the piston advances and, when the main valve finally closes, there will be less air in the cylinder to be compressed than where the main valve is closed at the beginning of the stroke. In this way the power of the engine may accurately be controlled. As the rod 37, which opens the main valve, moves up and down it actuates the pump plunger 44 so as to supply regularly measured quantities of fuel into the receiving chamber of the combined charge-measuring and injecting device. As the closing rod 38 for the main valve moves up and down it operates the plunger-like air valve 51, raising this valve as the rod is given a closing impulse to the main valve and consequently permitting the highly compressed air from the auxiliary outlet of the blower to rush through the receiving chamber in the measuring and injecting device, pick up the fuel contained in the chamber and carry it through the pipe 50 into the cylinder which has just been scavenged and filled with fresh air.

Whenever an adjustment is made to vary the amount of fresh air left in a cylinder to be compressed, it is desirable to reduce the amount of combustible proportionately in order that the cylinder may always be charged with the best mixture to secure efficiency and economy. This may conveniently be accomplished by providing means for adjusting the stroks of the plunger of the pump and at the same time that an adjustment of the closing means for the main valve is made. In the arrangement shown, the member 32 of the closing mechanism for the main valve is adjusted by means of a suitable lever, 70, connected to the actuating sleeve, 35. Connected to the lever 70 is another lever, 71, having a wedge block, 72, lying in position to engage with the under side of the bent end 74 of the lever 53 by means of which the pump plunger is operated. The downward movement of the pump plunger is limited by the wedge block 72. By properly arranging the parts, the wedge block is pushed beneath the free end of the lever 53 whenever an adjustment of the main valve-closing mechanism is made to shorten the downward stroke of the pump plunger just enough to reduce the amount of fuel supplied in the same proportion that the amount of air which is to be compressed in a cylinder is reduced, or is withdrawn far enough to increase the amount of fuel in proportion to the amount of air.

In Figs. 10 to 15 I have illustrated a modified arrangement which is perhaps better adapted for engines intended to run at a high speed than the other form. The main portions of the engine are the same in both forms, the difference lying simply in the valve construction and the details of the fuel injecting means. Above the several cylinders is a cylindrical housing, 80, corresponding to the housing 17 and within this housing is a cylindrical valve, 81, having a port for each of the cylinders. The tubular main valve is mounted within the housing so as to have both a rotary and an endwise movement. The ports 82 are made flaring, being wider at one end than at the other and being longer than the ports 83 which connect the interior of the housing with the upper ends of the cylinders. The opening and closing of communication between the interior of the main valve and the cylinders is effected by rotating the main valve while the length of time during which this communication is maintained is determined by the endwise position of the main valve; this period being the smallest when the endwise position of the main valve is such as to bring the narrowest portions of the ports therein over the ports leading to the cylinders and being greatest when the wide ends of the ports in the main valve are above the ports leading to the cylinders. On the closed end of the main valve is an outwardly-projecting shaft, 84, upon which is slidably mounted a sprocket wheel, 85, the sprocket wheel being obliged to rotate with the shaft. On the sprocket wheel is a hub having an annular groove, 86, into which extend the arms of a fork, 87, secured to some stationary part of the engine structure. Around the sprocket wheel 85 extends a sprocket chain, 88, which in turn passes over the sprocket wheel, 89, on the main crank shaft. With this arrangement the shaft 84 and the main valve may be driven directly from the main crank shaft while at the same time the shaft 84 and the main valve may be moved endwise without disturbing the driving connection.

Figures 13, 14, 15:
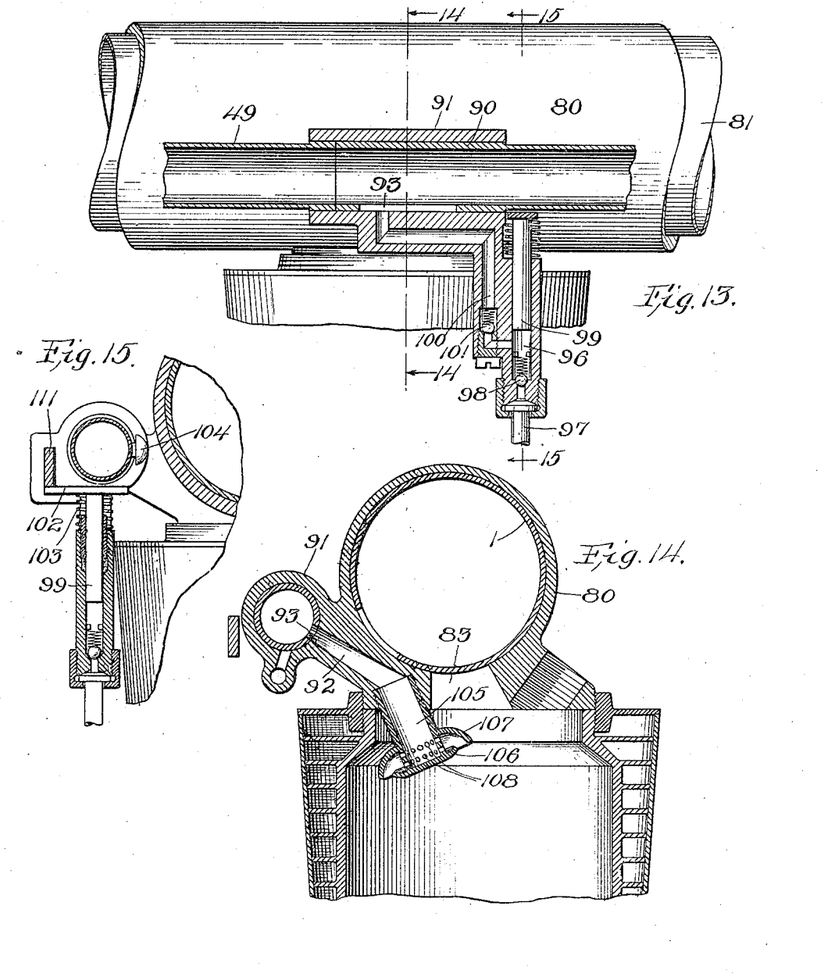
Fig. 13 is a view on an enlarged scale partly in side elevation and partly in section, of the valve mechanism associated with one of the cylinders of the engine shown in Fig. 10.
Fig. 14 is a section taken approximately on line 14—14 of Fig. 13.
Fig. 15 is a section taken approximately on line 15—15 of Fig. 13.

The fuel is admitted to the cylinders through a hollow cylindrical valve, 90, which is journaled in bosses, 91, projecting from one side of the housing 80, each boss being above one of the cylinders and having therein a port, 92, leading down into the top of the cylinder. The fuel valve has therein ports, 93, adapted to register one after the other with the ports leading into the corresponding cylinders. One end of the hollow fuel valve is closed while the other end is in open communication with the air supply pipe, 49, which conveys the small charges of highly compressed air from the fan. The fuel valve is actuated from the shaft 84 through a worm, 94, on the latter shaft meshing with a worm wheel, 95, on the closed end of the fuel valve, so that when the main valve is operated, the fuel valve is also operated in proper time relation thereto. In each of the bosses 91 is a pump chamber, 96, into which leads a branch pipe, 97, from the main fuel supply pipe 42. In the lower end of the pump chamber is a check valve, 98, and projecting out of the top of the chamber is a plunger, 99. A passage, 100, containing a check valve, 101, leads from the lower portion of each pump chamber to the interior of the corresponding boss or bushing, communicating therewith at a point in the path of the port in the fuel valve. On the upper end of each pump plunger is a head, 102, and beneath this head is a spring, 103, which serves to raise the plunger. The pump plungers are moved down by means of buttons, 104, projecting from the periphery of the fuel valve, each in position to engage one of the pump plungers at one point in the rotation of the fuel valve. The parts are so arranged that each pump plunger is forced down while the corresponding port in the fuel valve lies in communication with the passageway 100 leading from the pump chamber and consequently a charge of fuel will be pumped up through the passage 100 and will lie in the pocket or recess formed by the port 93. Then as the fuel valve moves around until it brings its port into registration with the port leading into the cylinder, the inrushing air from the pipe 49 blows the fuel into the cylinder in the form of a fine spray. In order to increase the spraying action, I prefer to shape the ports 92 which lead into the cylinders so that they become gradually larger as the cylinders are approached and make them terminate in spraying nozzles, 105. The spraying nozzle has a peculiar shape, being closed at its extreme end and provided with an outwardly-projecting annular flange, 106, and with an outwardly and downwardly-projecting annular flange, 107, at some distance removed from the end. A series of discharge openings 108 are arranged through the wall of the spraying device at points between the two flanges and thus the combustible is blown against and along the hot surfaces of the flanges so that not only is the combustible divided into a fine spray but it is also largely vaporized and therefore easily ignited.

When the main valve is moved lengthwise in order to lengthen the period during which the main supply of fresh air is in open communication with the cylinders it is also desirable to shift the position of the fuel valve so that the fuel will be injected just after the main air supply is cut off. I accomplish this by making one of the long sides of each of the flaring ports 82 in the main valve straight and arranging the opposite side, 110, at an angle corresponding to the angle of the thread on the worm 94. Consequently when the main valve is shifted lengthwise, the fuel valve is turned through a sufficient angle to compensate for the increased or diminshed effective width of the ports in the main valve. Furthermore, in order to regulate the supply of fuel in proportion to the volume of the main air charge, I connect with the shaft 84 a cam rod, 111, having therein a cam, 112, lying above each of the heads 102 on the pump plungers. These cams limit the upward movement of the pump plungers and consequently the stroke of the pump plungers depends upon the positions of the cams, that is upon the position of the main valve considered in its endwise relation.

In this form of my invention, as in the other, there is thorough scavenging of the engine cylinders; the power may be nicely regulated by varying the volume of air which is compressed; the fuel is effectively regulated so as always to maintain the proper mixture in the cylinders; the engine remains cool and runs smoothly; there are no delicate parts apt to get out of order; and, in addition, the incoming fuel is vaporized so that the charge will ignite readily, even when distillates or kerosene are used.

If desired there may be placed on the upper face of the piston a material of relatively poor conductivity in order that the heat will not be transmitted so readily to the piston. This may be accomplished by placing on the face of the piston a sheet of steel or, preferably as shown in the drawing, a layer of steel, 120, separated from the body of the piston by a layer of mica or other material having low heat conductivity and heat-resisting qualities. I also prefer to make the upper face of the piston concave as shown, as this increases the cooling capacity of the engine by reducing the area of the surface of the cylinder walls exposed to the heat.

I claim:

1. In combination, a combustion cylinder having air and fuel ports, a piston reciprocating within the cylinder toward and away from the said ports, means controlling the said ports operating to close the air port at a selected variable point in the movement of the piston toward the ports and to open the fuel port at a point in the movement of the piston which varies as the time of closing the air port is varied, means for delivering fuel to the said fuel port including a plunger operating to draw the amount of fuel required for a single charge at each stroke, and means for varying the stroke of the plunger in accordance with variations in the point in the movement of the piston at which the air port is closed.

2. In combination, a combustion cylinder having air and fuel ports, a piston reciprocating within the cylinder toward and away from the said ports, means controlling the said ports operating to close the air port at a selected variable point in the movement of the piston toward the ports and to open the fuel port at a point in the movement of the piston which varies as the time of closing the air port is varied, and means for delivering a measured variable quantity of fuel to the fuel port at each cycle of movement of the piston.

3. In combination, a combustion cylinder having air and fuel ports, a piston reciprocating within the cylinder toward and away from the said ports, means controlling the said ports operating to close the air port at a selected variable point in the movement of the piston toward the ports and to open the fuel port at a point in the movement of the piston which varies as the time of closing the air port is varied, means for delivering a measured quantity of fuel to the fuel port at each cycle of movement of the piston, and means for adjusting the said fuel-delivering means to vary the quantity of fuel delivered in accordance with variations in the point in the movement of the piston at which the air port is closed.

4. In combination, a combustion cylinder having a port, a piston reciprocating within the cylinder toward and away from said port, a blower connected with the said port having a capacity sufficient to deliver to the cylinder during each stroke of the piston therein a quantity of air greatly in excess of the capacity of the cylinder, means controlling the said port operating to close the port at a selected variable point in the movement of the piston, and means for introducing fuel into the cylinder.

5. In combination, a combustion cylinder having air and fuel ports, a piston reciprocating within the cylinder toward and away from the said ports, and means controlling the said ports operating to close the air port at a selected variable point in the movement of the piston toward the ports and to open the fuel port at a point in the movement of the piston which varies as the time of closing the air port is varied.

6. In combination, a combustion cylinder, a piston reciprocating within the cylinder, means for delivering fuel to the cylinder at a selected variable point in the movement of the piston, said means including a plunger operating to draw the amount of fuel required for a single charge at each stroke, and means for varying the stroke of the said plunger in accordance with variations in the point in the movement of the piston at which the fuel is delivered to the cylinder.

7. In a two-cycle internal combustion engine, an engine cylinder, a source of air under pressure, means for opening communication between said source and said cylinder at a predetermined point in the cycle of the engine and interrupting such communication at a selected variable point in the cycle, and means for introducing into the cylinder fuel in measured quantities varying from each other as the point at which interruption of the communication between the said source of air and the cylinder is varied.

8. In a two-cycle internal combustion engine, an engine cylinder, a piston in the cylinder, a source of air under pressure, means for opening communication between said source and the cylinder at a predetermined point in the working stroke of the piston and interrupting such communication at a selected variable point in the return stroke of the piston, and means for introducing into the cylinder fuel in measured quantities decreasing as the period of communication between the said source of air and the cylinder on the return stroke of the piston increases.

9. In a two-cycle internal combustion engine, an engine cylinder, a source of air under pressure, means for opening communication between said source and said cylinder at a predetermined point in the cycle of the engine and interrupting such communication at a selected variable point in the cycle, and means for introducing fuel into the cylinder at a point in the cycle varying as the point at which interruption between the source of air and the cylinder is varied.

10. In a two-cycle internal combustion engine, an engine cylinder, a source of air under pressure, a valve between said cylinder and said source for opening communication between the same at a fixed predetermined point in the engine cycle, means for adjusting said valve so as to cause it to close at a selected variable point in the cycle, a fuel-measuring device, an adjustable valve for admitting fuel from said device to the cylinder, and a connection between said valves for varying the timing of the fuel valve as the point in the cycle at which the air valve is closed is varied.

11. In a two-cycle internal combustion engine, an engine cylinder, a source of air under pressure, a valve between said cylinder and said source for opening communication between the same at a fixed predetermined point in the engine cycle, means for adjusting said valve so as to cause it to close at a selected variable point in the cycle, adjustable fuel-measuring and delivering mechanism, and means associated with said valve for varying the adjustment of said mechanism as the point in the cycle at which said valve is closed is varied.

12. In a two-cycle internal combustion engine, an engine cylinder, a source of air having a capacity sufficient to deliver to the cylinder during each stroke of the engine a quantity of air greatly in excess of the capacity of the cylinder, and means for opening communication between the said source and the cylinder at a predetermined point in the cycle of the engine and interrupting such communication at a selected variable point in the cycle.

13. In a two-cycle internal combustion engine, an engine cylinder, a blower arranged to receive air from the layer immediately adjacent to the exterior of the engine cylinder and deliver it into the cylinder, said blower having a capacity sufficient to deliver to the cylinder during each stroke of the engine an amount of air greatly in excess of the capacity of the cylinder, and valve mechanism between said blower and the interior of the said cylinder arranged to open communication between the blower and the cylinder at a predetermined point in the cycle of the engine and interrupt such communication at a selected variable point in the cycle.

14. In a two-cycle internal combustion engine, a plurality of engine cylinders, a casing surrounding the cylinders and having an inlet opening adjacent to each cylinder, a blower having its suction side connected to said casing, valve mechanism between the discharge side of the blower and the cylinders arranged to open communication between each cylinder and the blower at a predetermined point in the working stroke and to close such communication at a selected variable point in the return stroke, said blower having a capacity sufficient to deliver to each cylinder during each stroke of the engine an amount of air greatly in excess of the capacity of the cylinder.

15. In a gas engine, in combination, a power cylinder, separate means controlling the air and fuel charges for said cylinder, each of said means including a shaft, the shaft of the air-charge controlling means being longitudinally movable for varying the quantity of the air charge, and the shaft of the fuel-charge controlling means being angularly movable for varying the time of admission of the fuel charge, and a pair of intermeshing gears having oblique teeth, one fixed upon each of said shafts.

16. In combination, a combustion cylinder having an air port, a piston reciprocating within the cylinder toward and away from its said air port, means controlling the said air port operating to close the port at a selected variable point in the movement of the piston, means for injecting fuel into the cylinder at a selected variable point in the movement of the piston, and means for varying the quantity of fuel injected into the cylinder in accordance with the quantity of air remaining in the cylinder when the said air port is closed.

17. In an internal combustion engine, a cylinder, a source of compressed air of constant pressure, means for charging the cylinder with variable volumes of compressed air at the pressure of the source, and means for introducing into the cylinder measured quantities of a combustible material proportionate to the said volumes of air.

18. In a gas engine, in combination, a combustion cylinder, a piston reciprocating within the cylinder, a source of heated air under pressure, and means for opening communication between said source and the cylinder at a predetermined point in the movement of the piston and interrupting such communication at a selected variable point in the movement of the piston.

19. In combination, a combustion cylinder having an air port, means for delivering heated air to the said port, a piston reciprocating within the cylinder toward and away from its said air port, and means controlling the said air port operating to close the port at a selected variable point in the movement of the piston.

20. In combination, a combustion cylinder having an air port, means for delivering heated air to the said port, a piston reciprocating within the cylinder toward and away from its said air port, means controlling the said air port operating to close the port at a selected variable point in the movement of the piston, and means for injecting fuel into the cylinder.

21. In combination, a combustion cylinder having an air port, means for delivering heated air to the said port, a piston reciprocating within the cylinder toward and away from its said air port, means controlling the said air port operating to close the port at a selected variable point in the movement of the piston, means for injecting fuel into the cylinder operating at a selected variable point in the movement of the cylinder.

22. In combination, a combustion cylinder having an air port, means for delivering heated air to the said port, a piston reciprocating within the cylinder toward and away from its said air port, means controlling the said air port operating to close the port at a selected variable point in the movement of the piston, means for injecting fuel into the cylinder, and means for varying the quantity of fuel injected into the cylinder in accordance with the quantity of air remaining in the cylinder when the said air port is closed.

23. In combination, a combustion cylinder having an air port, means for delivering heated air to the said port, a piston reciprocating within the cylinder toward and away from its said air port, means controlling the said air port operating to close the port at a selected variable point in the movement of the piston, means for injecting fuel into the cylinder at a selected variable point in the movement of the piston, and means for varying the quantity of fuel injected into the cylinder in accordance with the quantity of air remaining in the cylinder when the said air port is closed.

24. In a gas engine, in combination, a combustion cylinder having an air jacket and an inlet and an exhaust port, both of which are simultaneously open during a part of each cycle of the engine, and a blower having a capacity to deliver during the said simultaneous opening of the said inlet and exhaust ports a quantity of air greatly in excess of the capacity of the said cylinder, said blower having its inlet connected with the air jacket of the cylinder and its outlet connected with the inlet port of the cylinder.

25. In combination, a combustion cylinder having an air port and an air jacket, an air passage connecting the air port and jacket, a piston reciprocating within the cylinder toward and away from its said air port, a valve operating to close the port during the movement of the piston toward the port, and an injector for forcing fuel directly into the cylinder.

26. In combination, a combustion cylinder having inlet and exhaust ports, and an air jacket, an air passage connecting the air jacket and inlet port, a piston reciprocating within the cylinder and controlling the exhaust port, and means controlling the inlet port operating to open the inlet port when the exhaust port is open and to close the inlet port at a selected variable time after the exhaust port is closed.

27. In combination, a combustion cylinder having inlet and exhaust ports and an air jacket, an air passage connecting the air jacket and inlet port, a piston reciprocating within the cylinder and controlling the exhaust port, means controlling the inlet port operating to open the inlet port when the exhaust port is open and to close the inlet port at a selected variable time after the exhaust port is closed, and means for introducing fuel into the cylinder at each stroke of the piston therein.

28. In combination, a combustion cylinder having inlet and exhaust ports and an air jacket, an air passage connecting the air jacket and inlet port, a piston reciprocating within the cylinder and controlling the exhaust port, means controlling the inlet port operating to open the inlet port when the exhaust port is open and to close the inlet port at a selected variable time after the exhaust port is closed, means for introducing a selected variable quantity of fuel into the cylinder at each stroke of the piston therein, and means for varying the quantity of fuel introduced at each stroke of the piston in accordance with the quantity of air remaining in the cylinder when the said inlet port is closed.

29. In combination, a combustion cylinder having inlet and exhaust ports, and an air jacket, an air passage connecting the air jacket and inlet port, a piston reciprocating within the cylinder and controlling the exhaust port, means controlling the inlet port operating to open the inlet port when the exhaust port is open and to close the inlet port at a selected variable time after the exhaust port is closed, means for introducing fuel into the cylinder at a selected variable point in the stroke of the piston, and means for varying the time at which the fuel is introduced in accordance with variations in the time when the said inlet port is closed.

30. In combination, a combustion cylinder having inlet and exhaust ports and an air jacket, an air passage connecting the air jacket and inlet port, a piston reciprocating within the cylinder and controlling the exhaust port, means controlling the inlet port operating to open the inlet port when the exhaust port is open and to close the inlet port at a selected variable time after the exhaust port is closed, means for introducing a measured variable quantity of fuel into the cylinder at a selected variable point in the stroke of the piston.

31. In combination, a combustion cylinder having air and fuel ports, a piston reciprocating within the cylinder toward and away from its said ports, means controlling the air port operating to close the port at a selected variable point in the movement of the piston toward the port and means controlling the fuel port operating to deliver a measured variable quantity of fuel into the cylinder through said port at a selected variable point in the stroke of the piston.

32. In combination, a combustion cylinder having air and fuel ports, a piston reciprocating within the cylinder toward and away from its said ports, means controlling the air port operating to close the port at a selected point in the movement of the piston toward the port, means controlling the fuel port operating to introduce a measured quantity of fuel into the cylinder through the port at a selected point in the stroke of the piston and unitary means for varying the point in the said movement of the piston at which the air port is closed, the quantity of fuel and the point in the stroke of the piston at which it is introduced.

33. The method of generating regulated variable power which consists in exploding successive confined charges of compressed air and fuel, each charge being formed by introducing air from a source of compressed air of constant pressure into the place of confinement, at the pressure of the source, in excess of the quantity required for the charge, expelling a part of such air without reduction of pressure, the amount expelled varying inversely with the power to be generated and in then injecting into the residue of air an amount of fuel which is proportioned to the amount of such residue of air.

34. The method of generating regulated variable power which consists in exploding successive confined charges of compressed heated air and fuel, each charge being formed by introducing air from a source of compressed heated air of constant pressure into the place of confinement, at the pressure of the source, in excess of the quantity required for the charge, expelling a part of such air without reduction of pressure, the amount expelled varying inversely with the power to be generated and in then injecting into the residue of air an amount of fuel which is proportioned to the amount of such residue of air.

35. The method of generating regulated variable power which consists in exploding successive confined charges of compressed air and fuel, each charge being formed by introducing air from a source of compressed air into the place of confinement in excess of the quantity required for the charge, returning a part of such air to the source, the amount returned varying inversely with the power to be generated and in then injecting into the residue of air an amount of fuel which is proportioned to the amount of such residue of air.

36. The method of generating regulated variable power which consists in exploding successive confined charges of compressed heated air and fuel, each charge being formed by introducing air from a source of compressed heated air into the place of confinement in excess of the quantity required for the charge, returning a part of such air to the source, the amount returned varying inversely with the power to be generated and in then injecting into the residue of air an amount of fuel which is proportioned to the amount of such residue of air.

In testimony whereof, I sign this specification in the presence of two witnesses.

GEORGE R. LAWRENCE.

Witnesses:
  WM. F. FREUDENREICH,
  RUTH E. ZETTERWALL.